United States Patent [19]
Bodin et al.

[11] Patent Number: 5,396,597
[45] Date of Patent: Mar. 7, 1995

[54] SYSTEM FOR TRANSFERRING DATA BETWEEN PROCESSORS VIA DUAL BUFFERS WITHIN SYSTEM MEMORY WITH FIRST AND SECOND PROCESSORS ACCESSING SYSTEM MEMORY DIRECTLY AND INDIRECTLY

[75] Inventors: William K. Bodin; David M. Hyde; Tatchi P. Lay, all of Boca Raton, Fla.; James Wilkinson, Sarisbury Green Southampton, United Kingdom; Susan Yee, Coral Springs, Fla.

[73] Assignee: International Business Machines Corporation, Armonk, N.Y.

[21] Appl. No.: 862,914

[22] Filed: Apr. 3, 1992

[51] Int. Cl.⁶ .................................... G06F 15/02
[52] U.S. Cl. ........................... 395/275; 395/250; 395/725; 364/239.5; 364/239.7; 364/245.6; 364/DIG. 1
[58] Field of Search ............... 395/275, 250, 425, 725; 364/239.5, 239.7, 245.6

[56] References Cited

U.S. PATENT DOCUMENTS

| | | | |
|---|---|---|---|
| 4,470,115 | 9/1984 | Wehr | 364/300 |
| 4,555,775 | 11/1985 | Pike | 364/900 |
| 4,569,034 | 2/1986 | Findley et al. | 364/900 |
| 4,571,671 | 2/1986 | Burns et al. | 364/200 |
| 4,642,790 | 2/1987 | Minshull et al. | 364/900 |
| 4,646,261 | 2/1987 | Ng | 364/900 |
| 4,654,020 | 3/1987 | Cheselka et al. | 364/900 |
| 4,710,767 | 12/1987 | Sciacero et al. | 340/799 |
| 4,811,205 | 3/1989 | Normington et al. | 364/900 |
| 4,815,010 | 3/1989 | O'Donnell | 364/521 |
| 4,818,932 | 4/1989 | Odenheimer | 324/121 |
| 4,843,544 | 6/1989 | Dulac et al. | 364/200 |
| 4,860,244 | 8/1989 | Bruckert et al. | 364/900 |
| 4,862,155 | 8/1989 | Dalrymple et al. | 340/747 |

(List continued on next page.)

FOREIGN PATENT DOCUMENTS

332417A1 9/1989 European Pat. Off. .
431618A2 12/1991 European Pat. Off. .

OTHER PUBLICATIONS

IBM Technical Disc. Bulletin vol. 32 No. 5B, Oct. 1989, G. T. Davis et al. "Double-Buffered Burst Direct Memory Access Assisted By Cycle Seal."

IBM Technical Disc. Bulletin vol. 33 No. 3A, Aug. 1990, L. E. Johnson et al. "Data Width And Format Conversion Subsystem For A Graphics Coprocessor."

*Primary Examiner*—Thomas C. Lee
*Assistant Examiner*—Moustafa M. Meky
*Attorney, Agent, or Firm*—Bruce D. Jobse; Duke W. Yee; Andrew J. Dillon

[57] ABSTRACT

A method and apparatus for the enhancing efficiency of a data processing system which includes a host microprocessor, a system memory, and a graphics adapter for producing an enhanced graphics display. The graphics adapter is coupled to the data processing system by a bus and includes a video memory and an adapter microprocessor, wherein the adapter microprocessor is less powerful than the host microprocessor in the data processing system. The method and apparatus of the present invention includes the establishment of a stage buffer from a portion of the system memory with the stage buffer, including at least two buffer sections. A first portion of data is transferred from the system memory into a first buffer section. Next, a second portion of data is transferred from the system memory into a second buffer section, while the adapter microprocessor is simultaneously retrieving the first portion of data from the first buffer section and transferring that first portion of data across the bus to the video memory, wherein host microprocessor is available to perform other tasks. When the adapter microprocessor has transferred the data to the video memory from the first buffer section, the host microprocessor fills the first buffer section with more data, while the adapter microprocessor retrieves data from the second buffer section. This process continues until all the data has been transferred.

7 Claims, 3 Drawing Sheets

U.S. PATENT DOCUMENTS

| | | | |
|---|---|---|---|
| 4,910,704 | 3/1990 | Gemma | 364/900 |
| 4,914,607 | 4/1990 | Takanashi et al. | 364/521 |
| 4,954,818 | 9/1990 | Nakane et al. | 340/721 |
| 4,954,819 | 9/1990 | Watkins | 340/721 |
| 4,954,983 | 9/1990 | Klingman | 364/900 |
| 4,965,670 | 10/1990 | Klinefelter | 358/183 |
| 4,965,750 | 10/1990 | Matsuo et al. | 364/521 |
| 5,001,469 | 3/1991 | Pappas et al. | 340/721 |
| 5,020,003 | 5/1991 | Moshenberg | 364/518 |
| 5,043,919 | 8/1991 | Callaway et al. | 364/521 |
| 5,046,023 | 9/1991 | Katsura et al. | 364/518 |
| 5,061,919 | 10/1991 | Watkins | 340/721 |
| 5,103,499 | 4/1992 | Miner et al. | 395/162 |
| 5,113,180 | 5/1992 | Gupta et al. | 340/747 |
| 5,117,486 | 5/1992 | Clark et al. | 395/250 |
| 5,197,145 | 3/1993 | Kitamura et al. | 395/425 |
| 5,224,213 | 6/1993 | Dieffenderfer et al. | 395/250 |
| 5,280,598 | 1/1994 | Osaki et al. | 395/425 |

SYSTEM FOR TRANSFERRING DATA BETWEEN PROCESSORS VIA DUAL BUFFERS WITHIN SYSTEM MEMORY WITH FIRST AND SECOND PROCESSORS ACCESSING SYSTEM MEMORY DIRECTLY AND INDIRECTLY

BACKGROUND OF THE INVENTION

1. Technical Field

The present invention relates in general to an improved method and apparatus for transferring data, and in particular to an improved method and apparatus for transferring data between system memory and non-system memory in a data processing system. Still more particularly, the present invention relates to an improved method and apparatus for transferring data between system memory and non-system memory in a manner which frees the host microprocessor for other tasks in the data processing system.

2. Description of the Related Art

In data processing systems, more advanced graphics adapters for controlling video displays have been introduced in which a microprocessor has been placed on the graphics adapter to control the display on a video terminal. For example, the Extended Graphics Adapter ("XGA adapter") is a high resolution graphics adapter with Micro-Channel direct memory access ("DMA") busmaster capability. Both the XGA adapter and the Micro Channel are products of International Business Machines Corporation. XGA is a trademark of International Business Machine Corporation, and Micro Channel is a registered trademark of International Business Machine Corporation.

Busmaster capability is the capability of an adapter or peripheral device to process tasks and access memory anywhere in the system address space, independently of the host microprocessor. In other words, the XGA adapter is able to process tasks and access memory anywhere in system address space independently of the data processing system's host microprocessor. In addition, this capability also includes the ability to access memory located on the adapter. Busmaster capability is provided utilizing a microprocessor provided in the XGA adapter. The microprocessor provided in such an adapter, however, is typically less powerful than the host microprocessor in a data processing system.

An XGA Virtual Device Driver ("VDD") is a component of the operating system whose purpose includes granting input/output ("I/O") privileges, saving/restoring video states, and providing a video bitmap for XGA applications executing in Virtual Dos Machines ("VDM"). Two of the principal functions of the XGA VDD are (1) saving the contents of the Video Random Access Memory ("VRAM") located in the XGA when a foreground XGA VDM session switches to the background and (2) restoring the VRAM data when a background XGA VDM session switches to the foreground.

Presently, when a foreground XGA VDM session is switched to the background and a background XGA VDM session is switched to the foreground, the microprocessor present in a video peripheral adapter sends a portion of the video data from VRAM to the bus and signals the host microprocessor that video data is present. The host microprocessor then saves the video data to system memory. When the host microprocessor finishes retrieving the video data from the bus, the XGA microprocessor places more video data on the bus for the host microprocessor to retrieve. This process continues until all the video data for the XGA VDM foreground session has been saved to system memory.

Thereafter, video data for the XGA VDM background session is retrieved from the system memory by the host microprocessor and sent across the bus to the XGA microprocessor, following a process in which data is placed on the bus by the host microprocessor and the XGA microprocessor is directed to retrieve the data in order to display the screen that was saved as a XGA VDM background session. The XGA microprocessor then retrieves the video data from the bus. This data transfer process continues until all of the XGA VDM background session video data has been retrieved from the system memory and placed into VRAM.

During this data transfer process in known systems, a first microprocessor must wait for the second microprocessor to finish placing data on the bus or retrieving data from the bus before the first microprocessor can place or retrieve data. Additionally, accessing the bus takes time. It would therefore be desirable to provide a method and apparatus which permits increased speed and efficiency in transferring data between system memory and non-system memory, in order to free up a host microprocessor to perform other tasks.

SUMMARY OF THE INVENTION

It is therefore one object of the present invention to provide an improved method and apparatus for transferring data in a data processing system.

It is another object of the present invention to provide an improved method and apparatus for transferring data between system memory and non-system memory in a data processing system.

It is yet another object of the present invention to provide improved method and apparatus for transferring data between system memory and non-system memory in a manner which frees up the host microprocessor for other tasks in the data processing system.

A method and apparatus for the enhancing efficiency of a data processing system which includes a host microprocessor, a system memory, and a graphics adapter for producing an enhanced graphics display. The graphics adapter is coupled to the data processing system by a bus and includes a video memory and an adapter microprocessor, wherein the adapter microprocessor is less powerful than the host microprocessor in the data processing system. The method and apparatus of the present invention includes the establishment of a stage buffer from a portion of the system memory with the stage buffer including at least two buffer sections. A first portion of data is transferred from the system memory into a first buffer section. Next, a second portion of data is transferred from the system memory into a second buffer section, while the adapter microprocessor is simultaneously retrieving the first portion of data from the first buffer section and transferring that first portion of data across the bus to the video memory, wherein after transferring the first portion of data into the first buffer section, the host microprocessor is available to perform other tasks. Additionally, the host microprocessor does not incur the time expense of waiting for bus arbitration. When the adapter microprocessor has transferred the data to the video memory from the first buffer section, the host microprocessor fills the first buffer section with more data, while the adapter microprocessor retrieves data from the second buffer section. This process continues until all the data has been transferred.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
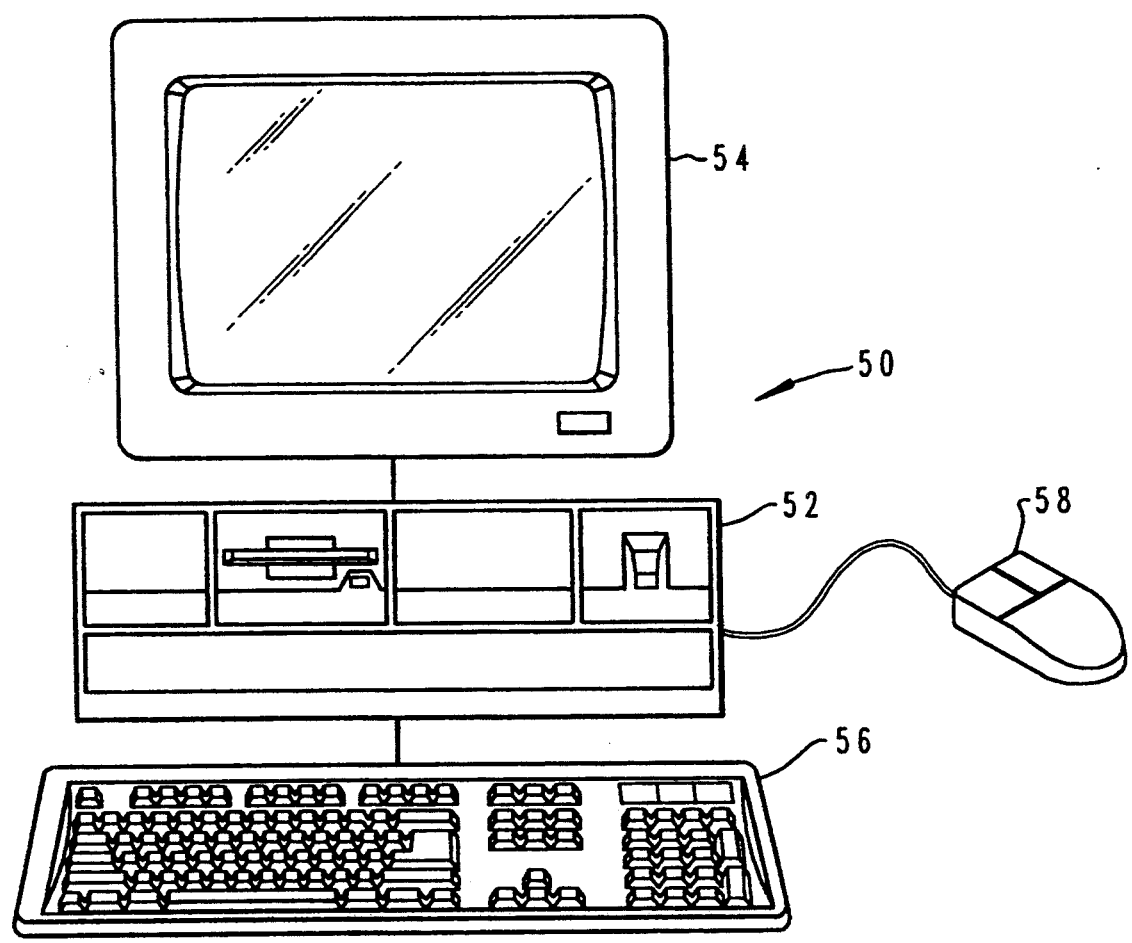
FIG. 1 depicts a pictorial representation of a data processing system which may be utilized to implement a method and system of the present invention.

With reference now to the figures and in particular with reference to FIG. 1, there is depicted pictorial representation of a data processing system in which a preferred embodiment in accordance with the present invention may be implemented. A personal computer 50 is depicted, which includes a system unit 52, a video display terminal 54, a keyboard 56, and a mouse 58. Personal computer 50 may be implemented utilizing any suitable computer such as an IBM PS/2 computer, a product of International Business Machines Corporation.

Figure 2:
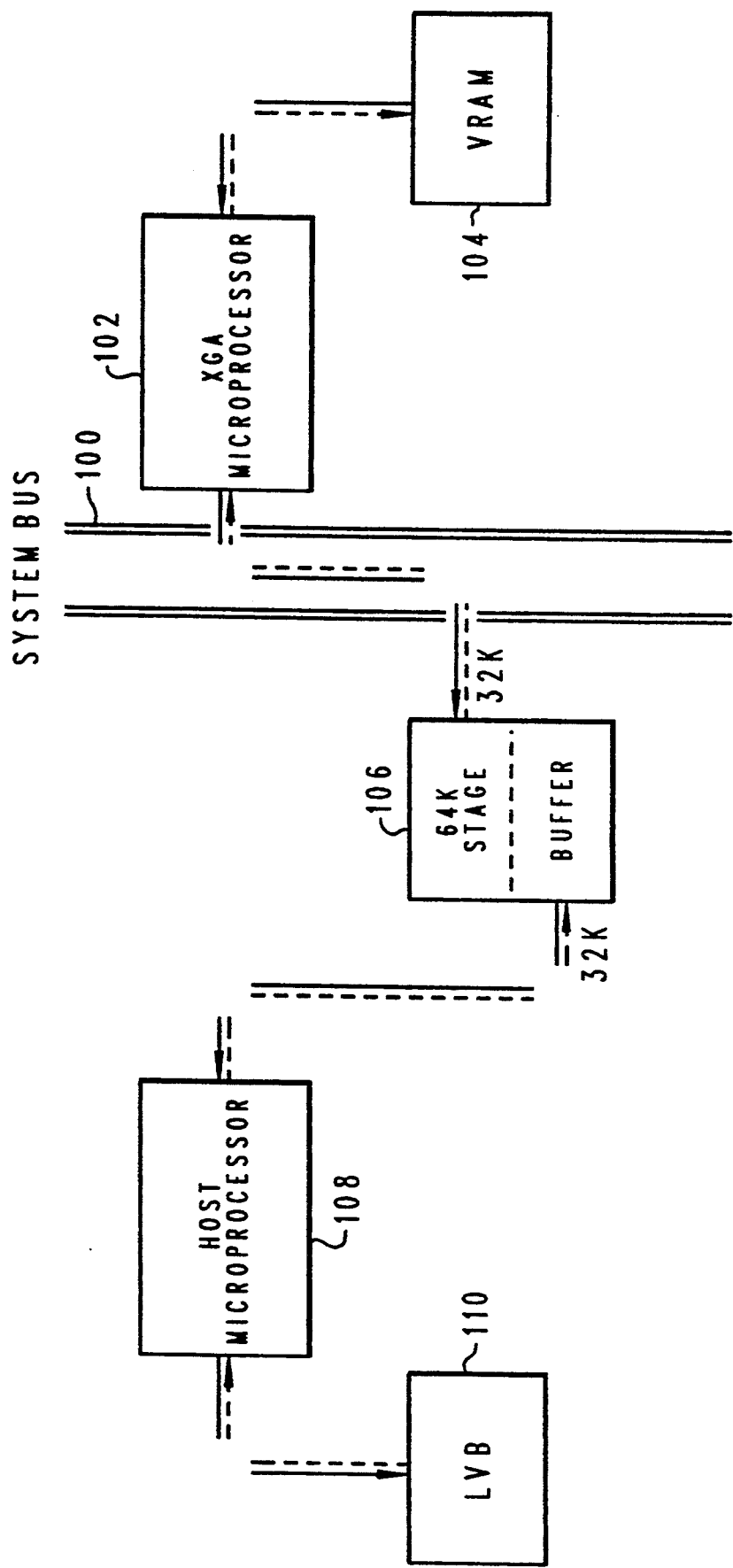
FIG. 2 is a high level schematic block diagram of system unit 52 a preferred embodiment of the present invention.

Referring now to FIG. 2, there is depicted a high level schematic block diagram of system unit 5.2 in a preferred embodiment of the present invention. System bus 100 has XGA microprocessor 102 connected to it. VRAM 104 is connected to XGA microprocessor 102. Additionally, stage buffer 106 is connected to system bus 100, and host microprocessor 108 is connected to stage buffer 106. Host microprocessor 108 is also connected to logical video buffer ("LVB") 110.

LVB 110 and stage buffer 106 are preferably both portions of system memory allocated for specific uses. LVB 110 is located in system memory and is utilized to store video data that is not currently being displayed on a video display terminal. Stage buffer 106 is a portion of system memory set aside to handle the transfer of video data from LVB 110 to VRAM 104 or from VRAM 104 to LVB 110. VRAM 104 is memory found on the XGA which is utilized to store video data that is displayed on the video display terminal. Typically, VRAM 104 may be from 512K bytes to one megabyte in size.

In accordance with a preferred embodiment of the present invention, stage buffer 106 is a block of 64K bytes of system memory that is locked down to prevent the swapping of data from occurring on that block of memory. In "locking down" memory, motion or swapping of the memory is prevented. Consequently, the memory which is "locked down" is made readily available for exclusive usage for a particular function or purpose. Stage buffer 106 is subdivided into two 32K byte buffers in accordance with a preferred embodiment of the present invention. Those skilled in the art will realize that stage buffer 106 may be established in other sizes of memory other than 64K bytes and that the two buffers may be of unequal sizes. Furthermore, it is contemplated in alternate embodiments of the present invention that more than two buffers may be utilized in stage buffer 106.

Next, in accordance with a preferred embodiment of the present invention, XGA microprocessor 102 utilizes stage buffer 106 to independently transfer data across bus 100 to and from VRAM 104, while host microprocessor 108 utilizes stage buffer 106 to transfer data to and from LVB 110. A virtual device driver is utilized to implement a preferred embodiment of the present invention.

Upon switching an XGA VDM to foreground or background, a save/restore data transfer routine in the virtual device driver requests 64K bytes of system memory to be used as stage buffer 106 in accordance with a preferred embodiment of the present invention. Stage buffer 106 is subdivided into two 32K buffers. As described above, stage buffer 106 is "locked down" in accordance with a preferred embodiment of the present invention.

Upon changing to background, XGA microprocessor 102 is directed by the virtual device driver to fill one 32K buffer in stage buffer 106 with data from VRAM 104. When this process is completed, host microprocessor 108 is directed by the virtual device driver to transfer data placed into the first 32K buffer to LVB 110, and XGA microprocessor 102 is directed to simultaneously fill the second 32K buffer with the next 32K bytes of data from VRAM 104.

Again upon completion, host microprocessor 108 is directed by the virtual device driver to transfer data from the second 32K buffer to LVB 110, and XGA microprocessor 102 is directed by the virtual device driver to simultaneously fill the other 32K buffer with the next 32K bytes of video data from VRAM 104. In accordance with a preferred embodiment of the present invention, XGA microprocessor 102 is placing data in one 32K buffer while host microprocessor 108 is reading the other 32K buffer simultaneously. This process continues until all the data from VRAM 104 has been transferred to LVB 110.

A similar process may be utilized to restore data to VRAM 104 from LVB 110. Host microprocessor 108 is directed by the virtual device driver fill one 32K buffer with video data from LVB 110. Thereafter, XGA microprocessor 102 is directed by the virtual device driver to transfer video data located in the 32K buffer to VRAM 104. While XGA microprocessor 102 is reading data from one 32K buffer, host microprocessor 108 is transferring data from LVB 110 into the other 32K buffer. As XGA microprocessor 102 finishes transferring data from one 32K buffer, the XGA microprocessor begins to transfer data from the other 32K buffer. Simultaneously, host microprocessor 108 is transferring data from LVB 110 into the 32K buffer, which is not being read by XGA microprocessor 102. Typically, after video data is stored to background, another set of video data representing a screen is retrieved and sent to VRAM for display.

This type of stage buffering scheme, switching between buffers created from system memory in accordance with a preferred embodiment of the present invention, allows host microprocessor 108 to operate strictly on system memory, stage buffer 106, and LVB 110. Such a data transfer scheme may save host microprocessor 108 four wait states per VRAM access in this particular embodiment since microprocessor 108 does not need to access bus 100. Although XGA microprocessor 102 incurs four wait states per stage buffer access, it does so independently of host microprocessor 108, allowing host microprocessor 108 to perform some other operation. In this manner, the multi-tasking capability of host microprocessor 108 is enhanced. This method and apparatus in accordance with a preferred embodiment of the present invention allows realization of the benefits of the XGA's DMA busmaster capability.

Figure 3:
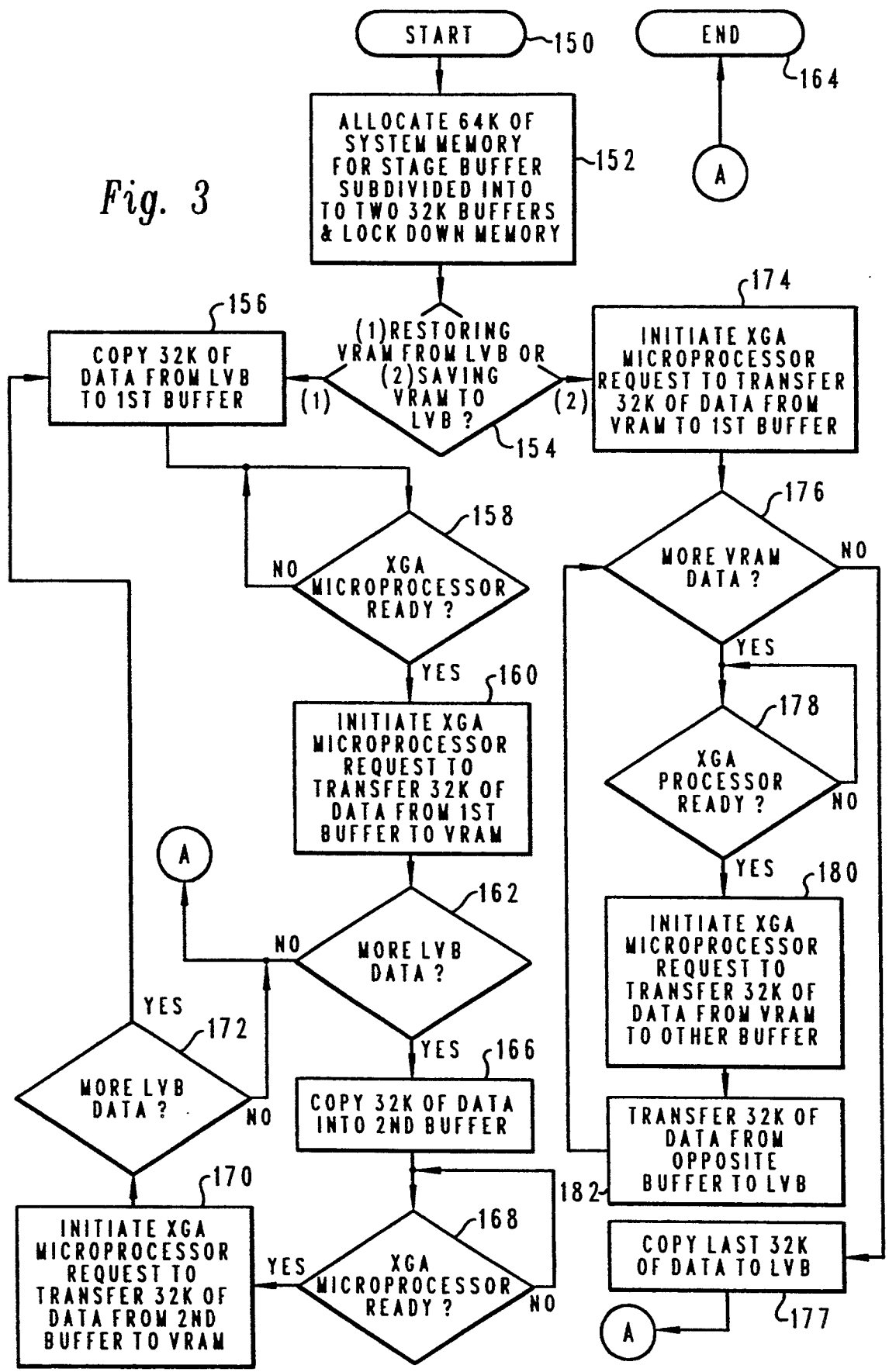
FIG. 3 depicts a logic flow chart of one implementation of the method of the present invention.

With reference to FIG. 3, there is depicted a high level flow chart of one implementation of the method of the present invention. As illustrated, the process begins at block 150 and thereafter proceeds to block 152, which depicts the allocation of 64K bytes of system memory for a stage buffer and the locking down of the 64K bytes of memory. As described above, the stage buffer in this particular embodiment is subdivided into two 32K buffers. A greater number of buffers or buffers of different sizes may be utilized in alternate embodiments of the present invention. Although the depicted embodiment shows the transferring of data by alternating between two buffers in the stage buffer, it is contemplated that in the case where more than two buffers are utilized, the sequence in which all or some subset of the buffers, located in the stage buffer, are utilized in the transferring of data may vary. Additionally, a stage buffer may be locked as long as an XGA application requires the saving and restoring of the VRAM.

Next, the process proceeds to block 154, which illustrates a determination of whether or not video data will be (1) restored to VRAM from LVB or (2) saved from VRAM to LVB. If the video data is to be restored to VRAM from LVB, the process then proceeds to block 156, which depicts the copying of 32K of data from LVB to the first buffer located within the stage buffer. Thereafter, as illustrated in block 158, a determination is made as to whether or not the XGA microprocessor is ready. If the XGA microprocessor is not ready, the process will wait by returning to block 158.

If, however, the XGA microprocessor is ready, the process then proceeds to block 160, which depicts initiating an XGA microprocessor request to transfer 32K of data from the first buffer to VRAM. Afterwards, the process proceeds to block 162, which illustrates a determination of whether more video data exists in the LVB for transfer to the VRAM. If no more LVB data exists, the process then terminates in block 164 via connector A. Referring back to block 162, if more of the LVB data exists, the process then proceeds to block 166, which depicts copying 32K of data into the second buffer.

Block 168 illustrates a determination of whether the XGA microprocessor is ready. If the XGA microprocessor is not ready, the process continues to return to block 168. Referring back to block 168, if the XGA microprocessor is ready, the process then proceeds to block 170, which depicts initiating an XGA microprocessor request to transfer 32K of data from the second buffer to VRAM. Thereafter, the process proceeds to block 172, which illustrates a determination of whether video data exists in the LVB for transfer to VRAM. If more LVB data does not exist, the process again terminates in block 164 via connector A. If, however, more LVB data exists, the process then proceeds back to block 156, which depicts copying 32K of data from LVB to the first buffer. This process continues until no more LVB data exists.

Referring again to block 154, if video data is to be saved from VRAM to LVB, the process proceeds to block 174, which depicts initiating an XGA microprocessor request to transfer 32K of data from VRAM to the first buffer. Thereafter, the process proceeds to block 176, which illustrates a determination of whether more VRAM data exists. If more VRAM data does not exist, the process proceeds to block 177, which depicts the copying of the last 32K of data to the LVB. Thereafter, the process terminates as illustrated in block 164 via connector A. Referring back to block 176 if more VRAM data does exist the process continues to block 178 which depicts a determination of whether the XGA microprocessor is ready. If the XGA microprocessor is not ready the process returns to block 178.

When the XGA microprocessor is ready, the process then proceeds to block 180, which illustrates initiating an XGA microprocessor request to transfer 32K of data from the VRAM to the other buffer. Afterwards, the process continues to block 182, which illustrates the transferring of 32K of data from the opposite buffer into the LVB. Thereafter the process returns to block 176 for a determination of whether more VRAM data exists. The opposite buffer is the buffer that does contain data to be transferred to the LVB at that time.

One advantage of this data transfer scheme in accordance with a preferred embodiment of the present invention is that it allows the host microprocessor to operate on its own system memory and requires the XGA microprocessor to incur the overhead of accessing the system bus. Moreover, both microprocessors are simultaneously employed to perform separate phases of the data transfer operation. Additional savings in the system/kernel/memory management overhead of locking and establishing physical addressability to the 64K stage buffer may be realized if the 64K of system memory remains lock between transfers.

The following pseudocode details one implementation of the method of the present invention in accordance with a preferred embodiment of the present invention for enhancing the transfer of data between LVB and VRAM utilizing a 64K stage buffer established from a portion of the system memory to free up the host microprocessor to perform other tasks during the wait states incurred by the XGA microprocessor transferring data from the 64K stage buffer to the VRAM.

```
initialize XGA Microprocessor for save/restore of Video Random
Access Memory to/from Logical Video Buffer
if RESTORING VRAM data from LVB
    copy 32K of data from LVB to first 32K of stage buffer
    initiate XGA Microprocessor request to xfer 32K of data from
    stage buffer to VRAM
    Do
        copy 32K of data from LVB to other 32K of stage
        buffer
        wait for XGA Microprocessor ready
        initiate XGA Microprocessor request to xfer 32K
        of data from stage buffer to VRAM
    until no more LVB data
else SAVE VRAM data to LVB
    initiate XGA Microprocessor request to xfer 32K of data
    from VRAM to first 32K of stage buffer
    Do
        wait for XGA Microprocessor ready
        initiate XGA Microprocessor request to xfer 32K
        of data from VRAM to other 32K of stage buffer
        copy 32K of data from opposite 32K of stage buffer
        to LVB
    until no more VRAM data
```

-continued

> wait for XGA Microprocessor ready
> copy 32K of data from stage buffer to LVB
>
> else Save/Restore via direct VRAM access While the invention has been particularly shown and described with reference to a preferred embodiment, it will be understood by those skilled in the art that various changes in form and detail may be made therein without departing from the spirit and scope of the invention.

What is claimed is:

1. A method for enhancing the efficiency of a data processing system having a host microprocessor, a system memory, and a graphics adapter for producing an enhanced graphics display, said host microprocessor directly coupled to said system memory, said graphics adapter coupled to said system memory by a bus and having a video memory and an adapter microprocessor, said method comprising the steps of:

establishing a stage buffer from a portion of said system memory, said stage buffer including a first buffer section and a second buffer section; locking down said stage buffer;

utilizing said host microprocessor to directly access said system memory to transfer a first portion of data from said system memory into said first buffer section;

utilizing said host microprocessor to directly access said system memory to transfer a second portion of data from said system memory into said second buffer section while said adapter microprocessor accesses said system memory via said bus with a plurality of wait states to retrieve said first portion of data from said first buffer section and transferring said first portion of data across said bus to said video memory, wherein after transferring said second portion of data, said host microprocessor is available to perform other tasks until said adapter microprocessor is finished retrieving said first portion of data from first buffer section;

utilizing said host microprocessor to directly access said system memory, to transfer another portion of data to said first buffer section after said adapter microprocessor has retrieved said first portion of data from said first buffer section, while said adapter microprocessor accesses said system memory via said bus with a plurality of wait states to retrieve said second portion of data from said second buffer section and transferring said second portion of data across said bus to said video memory, wherein after transferring said first portion of data, said host microprocessor is available to perform other tasks until said adapter microprocessor is finished retrieving said second portion of data from second buffer section; and continuing said process of utilizing said host microprocessor to transfer data until all data has been transferred from said system memory.

2. The method of claim 1 wherein data transferred into said stage buffer originates from a local video buffer located in said system memory.

3. The-method of claim 2, wherein said stage buffer includes a third buffer section.

4. A method for enhancing a data processing system in a transfer of data between a system memory and a peripheral device, said system memory and said peripheral device connected by a bus, said data processing having a host microprocessor directly coupled to said system memory, and said peripheral device having a microprocessor, said method comprising the steps of:

establishing a first buffer and a second buffer from a portion of said system memory; locking down said first buffer and second buffer;

utilizing said host microprocessor to directly access said system memory to transfer a first portion of data into said first buffer from said system memory;

utilizing said host microprocessor to directly access said system memory to transfer a second portion of data from said system memory into said second buffer while said microprocessor accesses said system memory via said bus with a plurality of wait states to read said first portion of data from said first buffer and transferring said first portion of data across said bus to said peripheral device, wherein after transferring said second portion of data, said host microprocessor is available to perform other tasks until said microprocessor is finished reading said first portion of data from said first buffer;

utilizing said host microprocessor to directly access said system memory to transfer another portion of data to said first buffer after said microprocessor has read said first portion of data from said first buffer, while said microprocessor accesses said system memory via said bus with a plurality of wait states to read said second portion of data from said second buffer and transferring said second portion of data across said bus to said peripheral device, wherein after transferring said another portion of data, said host microprocessor is available to perform other tasks until said microprocessor is finished transferring data from said second buffer; and continuing said process of utilizing said host microprocessor to transfer data until all data has been transferred from said system memory.

5. An apparatus for enhancing efficiency of a data transfer in a data processing system between a system memory and a peripheral adapter in said data processing system, said system memory and said peripheral adapter connected by a bus, said data processing system having a host microprocessor directly coupled to said system memory, and said peripheral having a microprocessor, said apparatus comprising:

means for establishing a stage buffer from a portion of said system memory, said stage buffer including a first buffer section and a second buffer section; means for locking down said stage buffer;

means for utilizing said host microprocessor to directly access said system memory to transfer a first portion of data from said system memory into said first buffer section;

means for utilizing said host microprocessor to directly access said system memory to transfer a second portion of data from said system memory into said second buffer section while said microprocessor accesses said system memory via said bus with a plurality of wait states to retrieve said first portion of data from said first buffer section and transferring said first portion of data across said bus to said peripheral adapter, wherein after transferring said second portion of data, said host microprocessor is available to perform other tasks until said microprocessor is finished retrieving said first portion of data from said first buffer section; and means for utilizing said host microprocessor to directly access said system memory to transfer another portion of data to said first buffer section after said microprocessor has retrieved said first portion of data from said first buffer section, while said microprocessor accesses said system memory via said bus with a plurality of wait states to retrieve said second portion of data from said second buffer section and transferring said second portion of data across said bus to said peripheral, adapter wherein after transferring said second portion of data, said host microprocessor is available to perform other tasks until said microprocessor is finished retrieving said second portion of data from said second buffer section.

6. The apparatus of claim 5, wherein said data is transferred from said system memory to said stage buffer by said host microprocessor.

7. The apparatus of claim 6, wherein said stage buffer includes a third buffer section.

* * * * *